May 19, 1925.
P. H. HORTON ET AL
AIR FILTER
Filed May 1, 1924
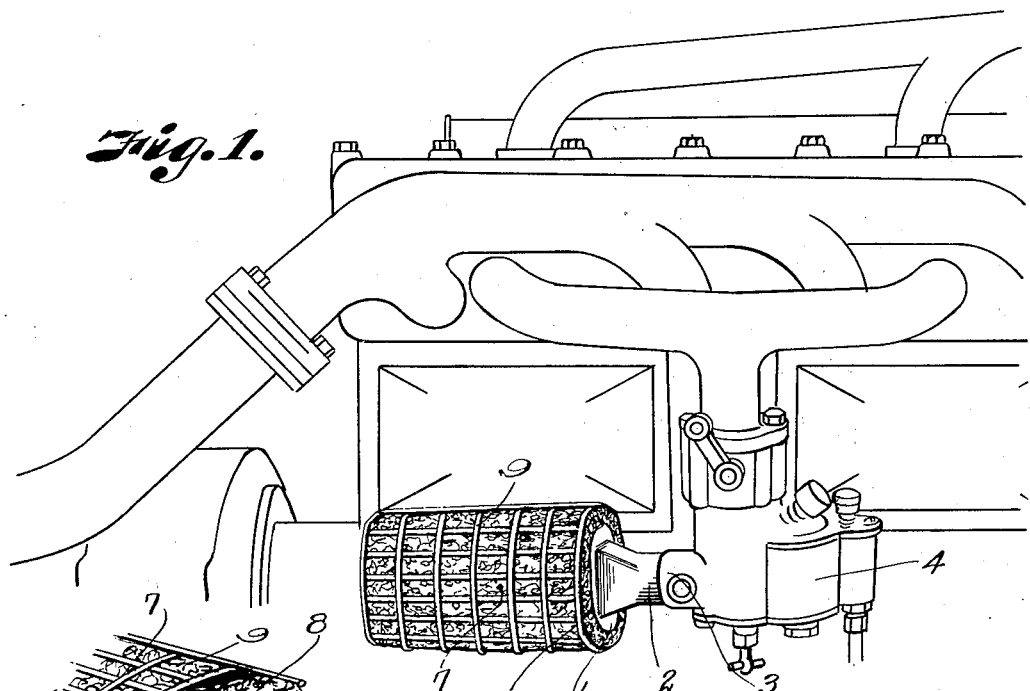
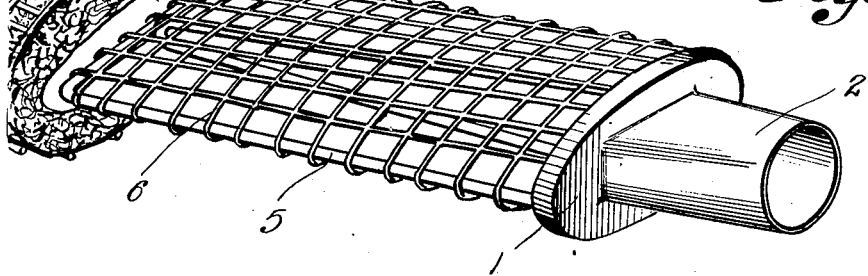
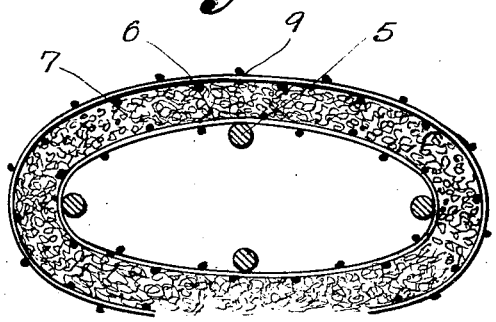
INVENTORS,
Patrick H. Horton
Charles E. Hose
BY Arthur C. Brown
ATTORNEY Patented May 19, 1925.

1,538,041

UNITED STATES PATENT OFFICE.

PATRICK H. HORTON AND CHARLES E. HOSE, OF KANSAS CITY, MISSOURI.

AIR FILTER.

Application filed May 1, 1924. Serial No. 710,419.

*To all whom it may concern:*

Be it known that we, PATRICK H. HORTON and CHARLES E. HOSE, citizens of the United States, residing at Kansas City, in the county of Jackson and State of Missouri, have invented certain new and useful Improvements in Air Filters; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to air filters for internal combustion engines, the primary object being to provide a novel form of air filter which may be attached to a convenient part of the engine, for example the air intake of the carburetor.

The invention is so constructed that when it is in place, atmospheric air must pass through a filter wall. It is desirable that such a filter be light in construction, that is have enough surface capacity to admit the requisite amount of air through the pores or cells of the filter bed and it is an important feature of our invention that the filter bed can be easily removed to relieve it of accumulated dust, dirt and other extraneous matter.

The novel construction of our invention will be apparent by reference to the following description in connection with the accompanying drawings, in which Fig. 1 is a perspective view of a filter constructed in accordance with our invention, the filter being shown as applied to the intake of a carburetor.

Fig. 2 is a perspective view of the filter frame or cage, a fragment of the filter bed being shown, and Fig. 3 is a cross sectional view through the invention.

The air filter is shown as comprising a frame or cage having a solid end wall or head 1 with a tubular outlet port 2 in the form of a neck which can be fastened to the intake collar or port 3 of a conventional type of carburetor 4. The head carries a reticulated hollow body or cage structure consisting of longitudinal wires 5 and transverse wires 6, the reticulated cage-like structure being preferably elliptical in cross section, that is provided with a long diameter and a short diameter so that the cage will be substantially flat with a space of course in the center, the purpose of this form being to allow the filter to be confined in a relatively small space close to the engine block.

The reticulated portion of the cage constitutes a form to receive a filter bed 7 in the form of an envelope or bag-like structure open at one end only to provide a pocket 8 within which the form is received, as clearly indicated in Fig. 1.

We may utilize different materials for the envelope but we prefer to employ sponge rubber or similar material because it can be easily fabricated into the desired envelope and because it can be constructed to have sufficient porosity to permit air to pass through it while retarding the passage of dust, dirt and other extraneous matter. Due to the elasticity of the rubber, it will tightly fit around the form so that danger of accidental removal will to a large extent be eliminated. However under some conditions, there may be a tendency for the filter wall to vibrate, so we have shown the invention with a screen-like cover 9 of reticulated material conforming generically to the shape of the reticulated core or form consisting of the wires 5 and 6. The outer screen 9 may be fastened over the end 1 in any suitable manner so as to prevent its accidental removal.

From time to time, it may be necessary to clean the filter bed or wall in which event the envelope 7 can be removed longitudinally of the form and washed or otherwise cleaned and re-applied to the form. While we prefer to use sponge rubber on account of its adaptability as a filter wall, we do not wish to be limited to any particular material but we reserve the right to make such changes in form, proportion and minor details of construction as will properly come within the scope of the appended claim.

While we have illustrated the air filter as applied to the intake of a carburetor, we do not wish to be limited to any particular use as obviously the air filter may be used wherever applicable for filtering air without departing from the spirit of the invention.

What we claim and desire to secure by Letters-Patent is:

An air filter comprising a cage-like form of reticulated material having a solid head at one end with a tubular opening for attachment to the intake of a carburetor, a bag-like envelope fitting over the cage, the envelope consisting of porous material and a reticulated screen embracing the envelope and co-operating with the cage to clamp the envelope in position.

In testimony whereof we affix our signatures.

PATRICK H. HORTON.
CHARLES E. HOSE.